(12) United States Patent
Suau et al.

(10) Patent No.: US 8,921,479 B2
(45) Date of Patent: Dec. 30, 2014

(54) ASSOCIATIVE IONIC THICKENING AGENTS CONTAINING ALKYLCYCLOHEXANOL ALKOYLATES, THEIR USES AND FORMULATIONS CONTAINING THEM

(71) Applicant: Coatex S.A.S., Genay (FR)

(72) Inventors: Jean-Marc Suau, Lucenay (FR); Denis Ruhlmann, Genay (FR)

(73) Assignee: Coatex, Genay (FR)

( * ) Notice: Subject to any disclaimer, the term of this patent is extended or adjusted under 35 U.S.C. 154(b) by 29 days.

(21) Appl. No.: 13/678,620

(22) Filed: Nov. 16, 2012

(65) Prior Publication Data

US 2013/0131259 A1     May 23, 2013

Related U.S. Application Data

(60) Provisional application No. 61/562,768, filed on Nov. 22, 2011.

(30) Foreign Application Priority Data

Nov. 18, 2011 (FR) ...................................... 11 03522

(51) Int. Cl.

| | |
|---|---|
| *C08L 33/10* | (2006.01) |
| *C09D 7/12* | (2006.01) |
| *C08F 2/38* | (2006.01) |
| *C09D 131/04* | (2006.01) |
| *C08L 33/02* | (2006.01) |
| *C08L 33/06* | (2006.01) |
| *C08L 33/14* | (2006.01) |
| *C09D 7/00* | (2006.01) |

(52) U.S. Cl.
CPC . *C08L 33/10* (2013.01); *C09D 7/12* (2013.01); *C09D 131/04* (2013.01); *C08L 33/02* (2013.01); *C08L 33/06* (2013.01); *C08L 33/14* (2013.01); *C09D 7/002* (2013.01)
USPC ........ 524/556; 524/558; 526/318.44; 526/82; 526/84; 526/85

(58) Field of Classification Search
CPC ......... C08L 33/10; C08L 33/02; C08L 33/06; C08L 33/14; C08F 2/38; C09D 7/12; C09D 7/002; C09D 131/04
USPC ............ 524/556, 558; 526/318.44, 82, 84, 85
See application file for complete search history.

(56) References Cited

U.S. PATENT DOCUMENTS

2011/0213072 A1 * 9/2011 Suau et al. .................... 524/558

FOREIGN PATENT DOCUMENTS

| FR | 2 872 815 | | 1/2006 |
|---|---|---|---|
| FR | 2 956 862 | | 9/2011 |
| JP | 58103339 A | * | 6/1983 |

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

New associative thickening agents belonging to the category of HASEs (Hydrophobically modified Alkali-Soluble Emulsions). These products contain an original associative monomer with a base of alkylcyclohexanol akoxylates. Their thickening power is greater than the HASE associative thickening agents of the prior art containing grafted alkyl phenols. An efficient substitute product is therefore available, which is free of alkyls phenols, matching current market demand.

16 Claims, No Drawings

ASSOCIATIVE IONIC THICKENING AGENTS CONTAINING ALKYLCYCLOHEXANOL ALKOYLATES, THEIR USES AND FORMULATIONS CONTAINING THEM

REFERENCE TO PRIOR APPLICATIONS

This application claims priority to U.S. provisional application Ser. No. 61/562,768, filed Nov. 22, 2011; and to French patent application 11 03522, filed Nov. 18, 2011, both incorporated herein by reference.

FIELD OF THE INVENTION

The present invention concerns new associative thickening agents belonging to the category of Hydrophobically modified Alkali-Soluble Emulsions (HASEs). These products contain an original associative monomer with a base of alkylcyclohexanol akoxylates. Their thickening power is greater than the HASE associative thickening agents of prior materials containing grafted alkyl phenols. An efficient substitute product is therefore available, which is free of alkyls phenols, matching current market demand.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. The description is to be regarded as illustrative in nature, and not as restrictive.

BACKGROUND OF THE INVENTION

Controlling the rheology of a paint, both in the stage of its manufacture, and during its transport, storage or use, remains a priority at the current time. The wide variety of constraints observed in each of these steps relates to a multiplicity of different rheological properties. Nevertheless, it is possible to summarise the requirement of the skilled man in the art in obtaining an effect of the thickening of the said paint, both for reasons of stability over time, and for a possible application to a vertical surface, lack of spattering during use, or of sagging after application, etc. As a consequence, the products which contribute to this regulation of the rheological properties have been designated by the term "thickening agents".

Historically, since the 1950s cellulose-based gums and products have been used, one of the essential characteristics of which is their high molecular weight. However, these compounds have a number of disadvantages, such as their instability over time (see document U.S. Pat. No. 4,673,518), the need to use a large quantity of them (see document EP 0 250 943 A1), and their production costs, notably in terms of waste treatment (see document U.S. Pat. No. 4,384,096).

Thickening agents called "associative" thickening agents were then created: these are water-soluble polymers having insoluble hydrophobic groups. Such macromolecules have an associating character: when introduced into water, the hydrophobic groups tend to assemble in the form of micellar aggregates. These aggregates are linked together by the hydrophilic parts of the polymers: a three-dimensional network is then formed which causes the viscosity of the medium to be increased. The operating mechanism and their characteristics are now well known and described, for example in the documents "Rheology modifiers for water-borne paints" (Surface Coatings Australia, 1985, pp. 6-10) and "Rheological modifiers for water-based paints: the most flexible tools for your formulations" (Eurocoat 97, UATCM, vol. 1, pp 423-442).

Among these thickening agents, a distinction is made between the category of HEURs (Hydrophobically modified Ethylene oxide URethane), and HASEs (Hydrophobically modified Alkali-Soluble Emulsions). The first designate polymers resulting from the synthesis between a compound of the polyalkylene glycol type, a polyisocyanate, and an alkyl and/or aryl associative monomer consisting of a hydrophobic terminal group. The second designate polymers of (meth)acrylic acid, of an ester of these acids and of an associative monomer having a polymerizable group and an oxyalkylated chain terminated by a hydrophobic group.

HEURs can give water-based paints many properties and advantages, notably depending on the nature of their associative monomer. The following patent applications registered by the company COATEX may be cited: EP 0 639 595 A1, which proposes hydrophobic groups having 4 to 36 carbon atoms to increase the Brookfield™ viscosity, WO 02/102868 A1, which describes the use of plurystyrylphenols with more than 40 atoms to increase the viscosity, whatever the shearing gradient, and finally EP 1 425 325 A1, which reveals an associative monomer consisting of di- and tristyrylphenol, enabling an excellent pigmentary compatibility and a high viscosity with low and medium shearing gradient to be obtained.

HEURs are nonetheless still chemical species which are not very water-soluble, and which require solvents or surfactants for solutioning, when their active matter % exceeds approximately 15%. This problem is explained in document EP 0 682 094 A1: the proposed solution is based trivially on the use of surfactants. In addition, it will be noted that thickening agents of the HEUR type, which are highly concentrated and contain surfactants, had been sold by the company COATEX™ under the names COAPUR™ 5035 and COAPUR™ 6050, before the priority date of this application, and from 1993 in the case of the first of these.

And the use of solvents and surfactants to formulate the HEUR-type thickening agent poses a number of problems. Firstly it will be recalled that solvents are subject to increasingly draconian legislation aimed at restricting and even prohibiting their use in paints. As for the surfactants of the thickening formulation, their nature is such that they sometimes have a problematic impact on paints, through interaction with the other surfactants contained in these paints. Consequently, formulating HEURs only in water is only possible provided the polyurethane concentration is restricted (of the order of 20% by weight), which makes these thickening agents ineffective in their untreated state, or provided their intrinsic thickening efficiency is reduced, which is not desirable.

The skilled man in the art therefore considers HASE-type thickening agents. Where the latter are concerned, the choice of the hydrophobic group of the associative monomer determines the varied rheological properties. The following patent applications filed by COATEX™ may be cited with this regard: EP 0 577 526 A1, which describes a fatty chain with linear or branched units of the alkyl and/or aryl type, having 26 to 30 carbon atoms, to develop high viscosities under a low shearing gradient, and EP 1 778 797 A1, which describes a branched terminal chain comprising 10 to 24 carbon atoms, to improve the pigmentary compatibility, and increase the viscosity generally.

Among the most efficient HASE thickening agents, in terms of thickening power, are the emulsions containing grafted alkyl phenols, which play the role of hydrophobic terminal chain. As examples, the products Rheotech™ 2100 and Rheotech™ 3000 sold by the company COATEX™ may be cited. However, alkyl phenols are currently widely suspected of being carcinogenic, and dangerous for reproduction; although still tolerated in the paints industry they nonetheless remain in the firing line of the legislative institutions in this area, notably the European ones. These products do not therefore constitute a satisfactory response for the skilled man in the art, even when they are grafted on to a polymer of high molecular weight.

DETAILED DESCRIPTION OF THE PREFERRED EMBODIMENTS

As explained above, having a HASE-type emulsion with a thickening power comparable to that of prior emulsions containing alkyl phenols, but without using the latter, represents a technical problem which was unresolved.

When working on this problem, the inventors succeeded in developing new associative acrylic thickening agents, using a particular associative monomer, the oxyalkylated chain of which bearing a hydrophobic group is an alkylcyclohexanol alkoxylate. Such compounds have been identified as surfactants, and can be obtained by alkoxylation of an alkyl phenol and hydrogenation of the product obtained. Reference may notably be made to the document U.S. Pat. No. 6,111,146 which describes their synthesis. The resulting compounds are designated by the expression "alkylcyclohexanol alkoxylates". It is noteworthy that the final structure is not that of an alkyl phenol, and that the resulting product will not be categorized as such.

Preferred associative monomers according to the invention have the following formula (I):

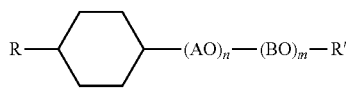

(I)

where:
  m and n are independent integers of less than 150, at least one of which is non-zero,
  A and B designate alkyl groups which are different one from another, and have 2 to 4 carbon atoms, where group AO preferentially designates ethylene oxide, and group BO preferentially designates propylene oxide,
  R' designates a polymerizable unsaturated group, preferentially methacrylate,
  R designates a linear or branched alkyl group containing 8 to 20 carbon atoms, and preferentially a linear alkyl group having 9 to 12 carbon atoms.

In Formula (I) each of the (AO) and (BO) groups can independently be reversed in direction—i.e., -(AO)— can be —(OA)- and —(BO)— can be —(OB)—.

The associative thickening agents which result from the polymerization of a monomer composition composed of one or more of these monomers of formula (I), of one or more of (meth)acrylic acid and of one or more of an ester of (meth) acrylic acid, which also make up a part of the invention, have no alkyl phenols; in an unexpected and particularly advantageous manner, they enable a water-based paint to be thickened to a level of viscosity at least equal to that provided by HASEs containing alkyl phenols. It is even demonstrated that a rheological profile is obtained for the invention which is very similar to that proposed by the products of the state of the art for alkyl phenols. A product has therefore successfully been developed which is at least equivalent, and which overcomes the problem relating to the use of alkyl phenols.

One preferred object of the invention therefore is a HASE-type emulsion, containing water and a polymer that is composed of:
  a) (meth)acrylic acid,
  b) an ester of (meth)acrylic acid, and
  c) a monomer of formula (I) above.

Preferred emulsions, associative monomers and associative thickening agents of the invention are also characterized in that, for the monomer of formula (I), one or more of the following apply:
AO designates ethylene oxide
BO designates propylene oxide
n=0
m=0
m is between 20 and 40
m is between 20 and 40
-(AO)— in Formula (I) is oriented as —(OA)-
—(BO)— in Formula (I) is oriented as —(OB)—
R' designates methacrylate
R designates a linear alkyl group having 9 to 12 carbon atoms subject, of course, to the limitation in Formula (I) that at least one of n and m must be non-zero.

These emulsions, associative monomers and associative thickening agents of the invention are also preferably characterized in that the polymer which they contain is composed of, expressed as a % by weight of each of its monomers:
  a) of 20% to 55%, preferentially 35% to 45%, of (meth) acrylic acid,
  b) of 40% to 70%, preferentially 45% to 55%, of at least one ester of (meth)acrylic acid,
  c) of 2% to 20%, preferentially 3% to 15%, of at least one monomer of formula (I).

Another preferred object of the invention is a method to thicken an aqueous formulation, by introducing an emulsion of the abovementioned HASE type, or an associative thickening agent of the invention, into the formulation.

Another preferred object of the present invention is an aqueous formulation containing a HASE-type emulsion according to the invention, or an associative thickening agent of the invention, where this formulation is preferentially characterized in that it is a water-based paint.

The following Examples provide illustrative embodiments of the invention. One of ordinary skill in the art will recognize the numerous modifications and variations that may be performed without altering the spirit or scope of the present invention. Such modifications and variations are encompassed within the scope of the invention. The Examples do not in any way limit the invention.

EXAMPLES

Example 1

This example illustrates the manufacture of a water-based paint, in which a thickening agent of the prior art containing an alkyl phenol having 15 carbon atoms and a thickening agent according to the invention, the R group of which is a linear alkyl chain having 9 carbon atoms, is used: the corresponding hydrophobic group therefore contains 15 carbon atoms in this case.

Test N° 1:

This test illustrates the prior art. It uses an aqueous emulsion with 30% by dry weight of a polymer containing grafted alkyl phenols, which is Rheotech™ 3000 sold by the company Coatex™.

Test N° 2:

This test illustrates the prior art. It uses an aqueous emulsion containing 30% by dry weight of a polymer consisting of, expressed as a % by weight of each of its monomers:
a) 37.1% (meth)acrylic acid,
b) 52.9% of ethyl acrylate,
c) 10.0% by weight of a monomer of formula R'—(OE)$_n$-R''' where R' designates the methacrylate group, OE is ethylene oxide, n is equal to 25 and R''' is the alkyl phenol group having 15 carbon atoms.

Test N° 3:

This test illustrates the invention. It uses an aqueous emulsion containing 30% by dry weight of a polymer consisting of, expressed as a % by weight of each of its monomers:
a) 37.0% (meth)acrylic acid,
b) 53.0% of ethyl acrylate,
c) 10.0% by weight of a monomer of formula (I) where -(AO)— in formula (I) is —(OA)- and designates ethylene oxide, m=0 and n=25, R' is the methacrylate group and R designates a linear alkyl group having 9 carbon atoms.

In each of the tests n° 1 to 3, 150 grams of Mowilith™ LDM 1871, 42 grams of bipermuted water and 6 grams of the emulsion to be tested are introduced into the beaker.

The pH is adjusted by using ammonia (28%) to a value of between 8.6 and 8.9. At 25° C., the Brookfield™ viscosities at 10 and 100 revolutions per minute ($\mu_{Bk10}$ and $\mu_{Bk100}$), and the Stormer™ ($\mu_S$) and ICI™ ($\mu_{ICI}$) viscosities of the paint are measured. Results are shown in table 1.

TABLE 1

| Test n° | | |
|---|---|---|
| 1 | 2 | 3 |
| Prior Art | | INvention |
| PA | PA | IN |
| $\mu_{Bk10}$ 17,500 | 16,900 | 18,300 |
| $\mu_{Bk100}$ 4,800 | 4,500 | 5,000 |
| $\mu_S$ 119 | 116 | 121 |
| $\mu_{ICI}$ 1.6 | 1.5 | 1.6 |

As used herein the terms composed of, contains, containing, including, and terms similar thereto, when referring to the ingredients, parts, reactants, etc., of a composition, component, etc., according to the invention mean, in their broadest sense, "includes at least" but also include within their definition all those gradually restricted meanings until and including the point where only the enumerated materials are included (e.g., consisting essentially of and consisting of).

The above written description of the invention provides a manner and process of making and using it such that any person skilled in this art is enabled to make and use the same, this enablement being provided in particular for the subject matter of the following list of preferred embodiments and the appended claims, which make up a part of the original description.

The following list of preferred embodiments are fully described herein in a manner allowing the skilled man to both make and use them:

Embodiment 1

A HASE-type emulsion, comprising water and a polymer comprising polymerized units of:
a) (meth)acrylic acid,
b) an ester of (meth)acrylic acid, and
c) a monomer of formula (I):

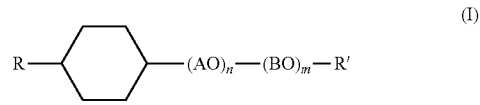

where:
m and n are independent integers of less than 150, at least one of which is non-zero,
A and B designate alkyl groups which are different one from another, and have 2 to 4 carbon atoms,
R' designates a polymerizable unsaturated group,
R designates a linear or branched alkyl group containing 8 to 20 carbon atoms
wherein in Formula (I) each of the -(AO)— and —(BO)— groups can independently be reversed in direction such that -(AO)— can be —(OA)- and —(BO)— can be —(OB)—.

Embodiment 2

The emulsion according to EMBODIMENT 1, wherein, for the monomer of formula (I), m=0, AO designates ethylene oxide, and n is between 20 and 40.

Embodiment 3

The emulsion according to EMBODIMENT 1, wherein the polymer comprises, expressed as a % by weight of each of its monomers:
a) of 20% to 55% of (meth)acrylic acid,
b) of 40% to 70% of an ester of (meth)acrylic acid,
c) of 2% to 20% of a monomer of formula (I).

Embodiment 4

The emulsion according to EMBODIMENT 3, wherein the polymer comprises, expressed as a % by weight of each of its monomers:
a) of 35% to 45% of (meth)acrylic acid,
b) of 45% to 55% of an ester of (meth)acrylic acid,
c) of 3% to 15% of a monomer of formula (I).

Embodiment 5

The emulsion according to EMBODIMENT 1, wherein, for the monomer of formula (I), -(AO)— is —(OA)- and designates ethylene oxide, m=0, n=25, R' is a methacrylate group and R designates a linear alkyl group having 9 carbon atoms.

Embodiment 6

A method of thickening an aqueous formulation, comprising introducing the HASE-type emulsion according to EMBODIMENT 1 into said formulation.

Embodiment 7

A water-based paint, comprising a HASE-type emulsion according to EMBODIMENT 1.

As used herein, the phrases "selected from the group consisting of," "chosen from," and the like include mixtures of the specified materials. The term "mentioned" notes exemplary embodiments, and is not limiting to certain species. As used herein the words "a" and "an" and the like carry the meaning of "one or more." When a polymer is referred to in shorthand notation as comprising a monomer (or like phrases), the monomer is present in the polymer in polymerized form. As used herein the term (meth)acrylic means methacrylic and acrylic, includes mixtures, and supports both terms.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A HASE-type emulsion, comprising water and a polymer comprising polymerized units of:
   a) (meth)acrylic acid,
   b) an ester of (meth)acrylic acid, and
   c) a monomer of formula (I):

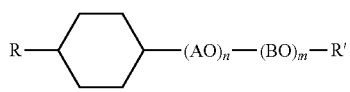

(I)

wherein:
   m and n are independent integers of less than 150, at least one of which is non-zero,
   A and B designate alkyl groups which are different one from another, and have 2 to 4 carbon atoms,
   R' designates a polymerizable unsaturated group,
   R designates a linear or branched alkyl group containing 8 to 20 carbon atoms,
   or a monomer of formula (I) in which at least one of the -(AO)— and -(BO)— groups are reversed in direction such that -(AO)— is —(OA)- and -(BO)— is —(OB)—.

2. The emulsion according to claim 1, wherein, for the monomer of formula (I), m=0, AO designates ethylene oxide, and n is between 20 and 40.

3. The emulsion according to claim 1, wherein the polymer comprises, expressed as a % by weight of each of its monomers:
   a) of 20% to 55% of (meth)acrylic acid,
   b) of 40% to 70% of an ester of (meth)acrylic acid,
   c) of 2% to 20% of a monomer of formula (I).

4. The emulsion according to claim 3, wherein the polymer comprises, expressed as a % by weight of each of its monomers:
   a) of 35% to 45% of (meth)acrylic acid,
   b) of 45% to 55% of an ester of (meth)acrylic acid,
   c) of 3% to 15% of a monomer of formula (I).

5. The emulsion according to claim 1, wherein, for the monomer of formula (I), -(AO)— is —(OA)- and designates ethylene oxide, m=0, n=25, R' is a methacrylate group and R designates a linear alkyl group having 9 carbon atoms.

6. A method of thickening an aqueous formulation, comprising introducing the HASE-type emulsion according to claim 1 into said formulation.

7. A water-based paint, comprising a HASE-type emulsion according to claim 1.

8. The emulsion according to claim 1, wherein c) is the monomer of formula (I):

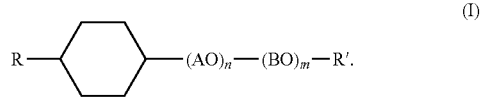

(I)

9. The emulsion according to claim 1, wherein c) is the monomer of formula (I) in which at least one of the -(AO)— and -(BO)— groups are reversed in direction such that -(AO)— is —(OA)- and -(BO)— is —(OB)—.

10. The emulsion according to claim 1, wherein AO designates ethylene oxide and BO designates is oxide.

11. The emulsion according to claim 1, wherein m is between 20 and 40 and m is between 20 and 40.

12. The emulsion according to claim 1, wherein R' designates methacrylate.

13. The emulsion according to claim 1, wherein R designates a linear alkyl group having 9 to 12 carbon atoms.

14. The emulsion according to claim 1, wherein the polymer is composed of, expressed as a % by weight of each of its monomers:
   a) 20% to 55% of (meth)acrylic acid,
   b) 40% to 70% of at least one ester of (meth)acrylic acid,
   c) 2% to 20% of at least one monomer of formula (I).

15. The emulsion according to claim 1, wherein c) is the monomer of formula (I) in which the -(AO)— and -(BO)— groups are reversed in direction such that -(AO)— is —(OA)- and -(BO)— is —(OB)—.

16. A method of preparing the emulsion according to claim 1, comprising combining water and the polymer.

* * * * *